United States Patent
Simontacchi

(10) Patent No.: US 7,410,329 B2
(45) Date of Patent: Aug. 12, 2008

(54) DEVICE FOR CONVEYING POWDERS THROUGH PIPELINES

(75) Inventor: Giancarlo Simontacchi, Lonate Pozzolo VA (IT)

(73) Assignee: Geico S.p.A., Cinisello Balsamo MI (IT)

( * ) Notice: Subject to any disclaimer, the term of this patent is extended or adjusted under 35 U.S.C. 154(b) by 128 days.

(21) Appl. No.: 10/564,281

(22) PCT Filed: Jul. 7, 2004

(86) PCT No.: PCT/EP2004/007423

§ 371 (c)(1),
(2), (4) Date: Jan. 11, 2006

(87) PCT Pub. No.: WO2005/005060

PCT Pub. Date: Jan. 20, 2005

(65) Prior Publication Data

US 2006/0193704 A1   Aug. 31, 2006

(30) Foreign Application Priority Data

Jul. 11, 2003   (IT)   .......................... MI2003A1419

(51) Int. Cl.
*B65G 53/28* (2006.01)
(52) U.S. Cl. .......................... 406/98; 406/91; 406/109; 406/123; 406/153
(58) Field of Classification Search .......... 406/88, 406/89, 90, 91, 98, 109, 123, 128, 144, 151, 406/152, 153, 192
See application file for complete search history.

(56) References Cited

U.S. PATENT DOCUMENTS 3,260,285 A * 7/1966 Vogt ............................ 141/8
3,836,288 A * 9/1974 Evans .......................... 417/307
3,842,522 A * 10/1974 Holzenberger et al. ........ 37/195
4,154,484 A * 5/1979 Holzenberger ............... 406/106
4,407,436 A * 10/1983 Broadfoot et al. ............ 222/636
4,740,112 A * 4/1988 Muehlberger et al. ......... 406/50
4,893,966 A    1/1990 Roehl .......................... 406/127
5,240,355 A * 8/1993 Hudalla ........................ 406/95
6,283,680 B1 * 9/2001 Vidal .......................... 406/128

(Continued)

FOREIGN PATENT DOCUMENTS

DE    10247829 A1    4/2004

(Continued)

OTHER PUBLICATIONS

Patent Abstracts of Japan, vol. 1997, No. 7, Jul. 31, 1997 & JP09071325A (Ogawa Kazutoshi).

*Primary Examiner*—Douglas A Hess
(74) *Attorney, Agent, or Firm*—Jacobson Holman PLLC

(57) ABSTRACT

A device for conveying powders through pipelines including at least one pumping device which in turn includes a suction inlet and a delivery outlet and a tubular chamber with opposite ends connected respectively to the suction inlet through an input valve and to the delivery outlet through an output valve. A vacuum source and a pressure source are connected upon command to the chamber in axially distanced positions to create a vacuum respectively and alternatively in the chamber in relation to the environment upstream of the device and a pressure in relation to the environment downstream of the device.

9 Claims, 2 Drawing Sheets

U.S. PATENT DOCUMENTS

| | | | |
|---|---|---|---|
| 6,447,216 B1 * | 9/2002 | Higuchi et al. | 406/27 |
| 6,478,513 B1 * | 11/2002 | Higuchi et al. | 406/19 |
| 6,508,610 B2 * | 1/2003 | Dietrich | 406/13 |
| 6,786,681 B2 * | 9/2004 | Grasshoff | 406/11 |
| 6,939,088 B2 * | 9/2005 | Farrell | 406/192 |
| 6,953,315 B2 * | 10/2005 | Cartwright | 414/217 |
| 7,144,213 B2 * | 12/2006 | Cartwright | 414/217 |
| 7,150,585 B2 * | 12/2006 | Kleineidam et al. | 406/50 |
| 7,163,359 B2 * | 1/2007 | Moser | 406/74 |
| 7,192,222 B2 * | 3/2007 | Van Mullekom et al. | 406/197 |
| 7,241,080 B2 * | 7/2007 | Klobucar et al. | 406/50 |

FOREIGN PATENT DOCUMENTS

WO  WO2004/087331  10/2004

* cited by examiner

DEVICE FOR CONVEYING POWDERS THROUGH PIPELINES

FIELD OF THE INVENTION

This is a nationalization of PCT/EP2004/007423 filed 7 Jul. 2004 and published in English.

BACKGROUND OF THE INVENTION

The present invention herein refers to a device for conveying fine powders through pipelines.

At the present state of the art there are various types of apparatus for transferring products in powder of various kinds from one container to another through special pipelines. In particular these types of apparatus are useful in painting plants that use paint in powder. In fact in such plants it is necessary to have an apparatus for the suction of paints in powder from any container whatsoever and for reconveying it to the spray painting guns.

Among the existing systems of conveying powder the Venturi-effect injectors can be mentioned. These injectors suck back the powder thanks to a jet of compressed air that is made to pass through a special convergent/divergent tube, and launch it along a conveyor tube using the same compressed air, often with the addition of supplementary conveying air. However, these systems present some problems, for example the consumption or the obstruction of the Venturi tubes, the inconstancy of the flow during prolonged use and the need for considerable maintenance. In addition the Venturi injectors require a high quantity of conveying air that then has to be discharged at the destination of the product in powder; this results in not being very convenient in various applications.

In addition to the Venturi injectors vacuum systems can also be mentioned. Such systems suck back the product in powder forming a vacuum in the conveying conduits. They have the problem of having to discharge the vacuum at the destination of the product; this makes it necessary to insert special devices that make the costs and complexity of the overall plant increase. In addition, the cleaning of the circuits of a vacuum system is rather difficult and problematic.

Recently the "volumetric" type of systems for the suction and reconveying of products in powder into pipelines have also been studied; nevertheless these systems use pistons with alternative movements and therefore, they are quite expensive.

Another system of conveying powders comprises a tubular chamber connected to the suction conduit by means of a first sleeve valve and to the delivery conduit by means of a second sleeve valve. Said chamber is positioned at a lower level than the tank from which the powders start, so as to allow the fall by gravity of the powders inside it. The chamber is fitted with an inlet of blowing air that enables the powder in it to be pushed into the delivery conduit. Such systems do not allow a continuous flow in output and have the disadvantage of having to be necessarily positioned at a lower level than the starting tank. To resolve the problem of the below-level positioning, the known technique of applying both a pressure source and a vacuum source alternatively to the hole was considered; in this manner it is possible to suck the powder into the chamber without relying only on the fall by gravity. In this embodiment, to find a solution between the need of suction and that of thrust of the powders, the hole is located in the chamber halfway between the inlet and the outlet. This causes strong disuniformity between the cycles of the pump and the quantity of powder injected at every cycle is variable and not easily controllable. To stabilize the flow in output from the device, it therefore became necessary to connect the two chambers in parallel with unsynchronized operating cycles. As a further disadvantage, the inlet valves of the two chambers are fitted with such a mechanical drive that when one of the two valves is open the other is closed. The two outlet valves are also fitted with a mechanical drive of this type. Such a device does not however permit the overlapping of the injection phases of the two chambers and thus does not allow a satisfactorily continuous flow of powder in output from the pump to be obtained.

SUMMARY OF THE INVENTION

The aim of the present invention is to improve the above-mentioned aspects by providing a device which, among other things, can support a continuous flow of powder, needs little conveying air and is economical compared to the devices of the know art.

In view of this aim it was decided to produce, in accordance with the invention, a device for conveying powders through pipelines comprising at least one pumping device comprising in turn a suction inlet and a delivery outlet, a tubular chamber with opposite ends connected respectively to said inlet through an input valve and to said outlet through an output valve, a vacuum source and a pressure source connected upon command to the chamber in axially distanced positions to create a vacuum respectively and alternatively in the chamber in relation to the environment upstream from the device and a pressure in relation to the environment downstream from the device.

To clarify the explanation of the innovative principles of the present invention and its advantages in comparison to the known technique, herein below is described, with the help of enclosed drawings, the example of a possible embodiment applying such principles. In the drawings:

DETAILED DESCRIPTION OF THE PREFERRED EMBODIMENTS

Figure 1:
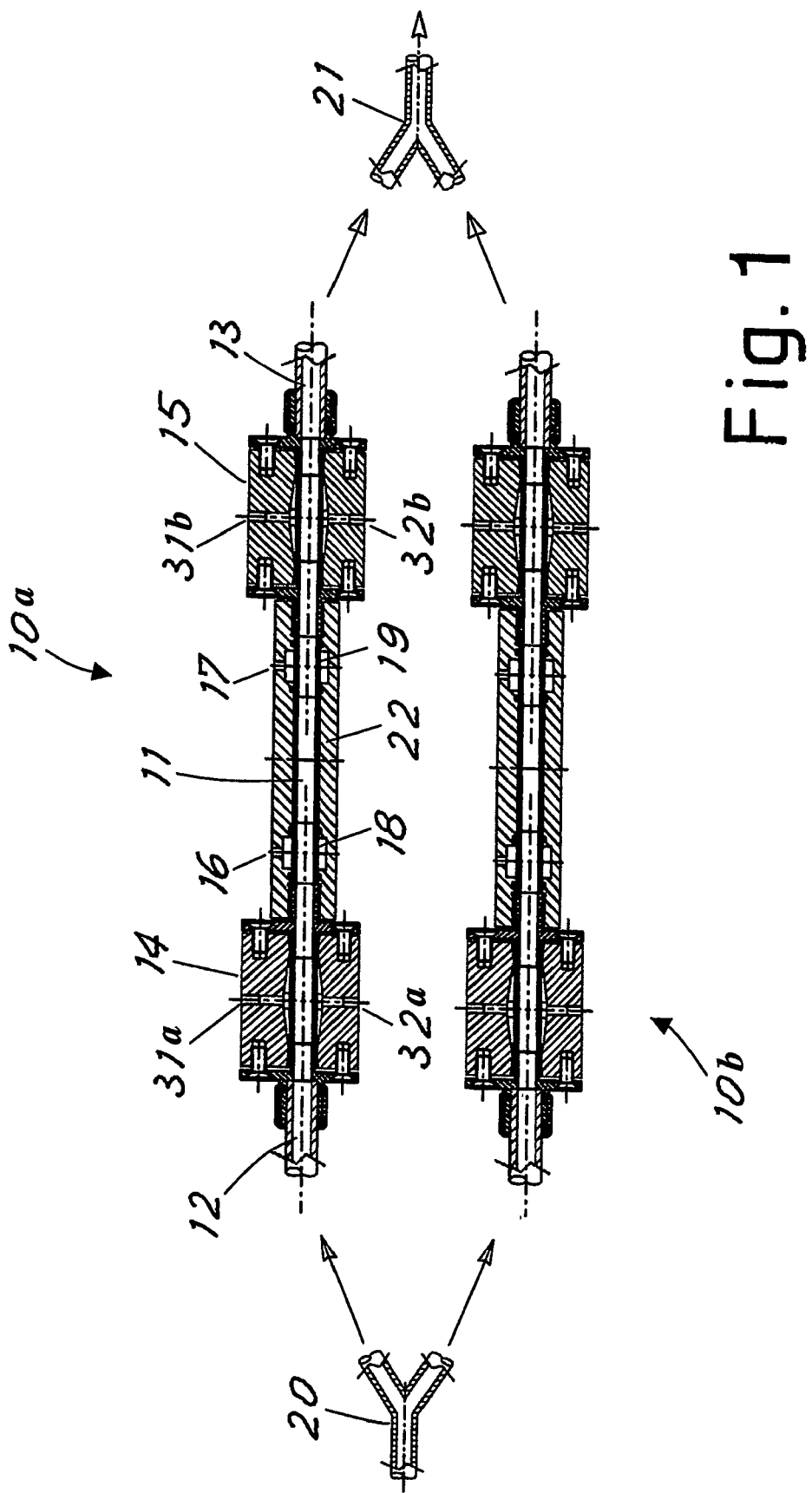
FIG. 1 represents a view in section of a device in accordance with the invention.

FIG. 1 shows an embodiment of the invention comprising two identical pumping devices 10a and 10b connected in parallel by means of a tubular "Y" element 20 upstream and by means of a tubular "Y" element 21 downstream. The powder starting container (not shown in the Figures) is connected upstream from the tubular element 20, while the delivery tube (not shown in the Figures) into which the powders are to be sent is connected downstream from the tubular element 21. Each pumping device 10 comprises a rectilinear tubular chamber 11, a suction inlet 12 and a delivery outlet 13. The tubular chamber 11 is housed inside a containing body 22 and its two opposite ends are connected respectively to the suction inlet 12 by means of an input valve 14 and to the delivery outlet 13 by means of an output valve 15. Said valves can be, for example, "vacuum pinch valves", as will be described herein below. The internal cylindrical wall of the tubular chamber 11 is fitted with two segments of porous tube 18 and 19. The wall of these segments of porous tube allows air, but not powder, to pass. An inlet hole 16 and an outlet hole 17 respectively are made in the containing body 22, in correspondence with the segments of porous tube 18 and 19, and both have a small ring-shaped chamber. The inlet 16 and outlet 17 holes place the chamber 11 in communication respectively with a pressure source (not shown) and with a vacuum source (not shown). This pressure source is suitable for raising the internal pressure of the chamber to above the pressure level existing downstream from the tubular element 21. The vacuum source is suitable for lowering the internal pressure of the chamber below the pressure level existing upstream from the tubular element 20. The pressure and vacuum sources mentioned above can be connected to and disconnected upon requirement from the chamber 11 by means of suitable command means (not shown in the Figure). The inlet hole 16 and the relative porous tube 18 are located in proximity of the inlet valve 14; the outlet hole 17 and the relative porous tube 19 are located in proximity of the outlet valve 15. This arrangement favors the suction and delivery of the powders in input to and in output from the chamber 11.

Figure 2:
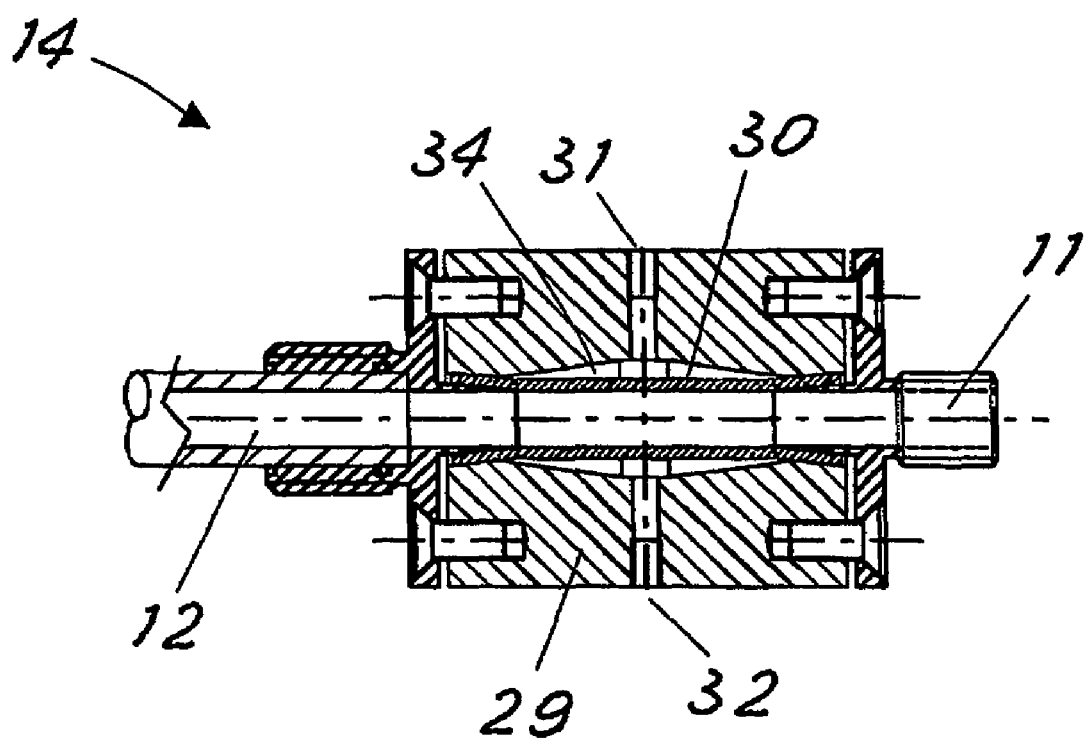
FIG. 2 represents a view in section of a detail of the apparatus of FIG. 1.

FIG. 2 shows a "vacuum pinch valve" 14 in detail. This is a valve of the sleeve type in the body 29 from which a drive chamber 34 containing a soft tube 30 is made. The drive chamber 34 can be connected through the input hole 31 to a source of compressed air for closing the soft tube. In addition an outlet hole 32 is present that puts the drive chamber 34 in communication upon command with a vacuum source to force the re-opening of the valve passage section.

We shall now describe the operation of the device described above. In doing this, the operating cycle of one of the two pumping devices 10 shall be described, considering that the operating cycle of the other pumping device 10 is perfectly identical, but simply out of phase in relation to the first as will be clarified below.

In a first phase, the valves 14 and 15 are closed by effect of the pressure applied to the holes 31a and 31b, and the chamber 11 is put into vacuum starting from the outlet hole 17 by means of the porous tube 19; after which the valve 14 is opened, by effect of the vacuum applied to its outlet hole 32a. With this configuration of pressures the powder is sucked inside the chamber 11 through the opening 12 that communicates with the powder starting container.

In a second phase, the valve 14 is closed by effect of the pressure that is applied to its inlet hole 31a, after which the chamber 11 is put in pressure starting from the inlet hole 16 through the porous tube 18 and the valve 15 is opened by effect of the vacuum that is applied to its outlet hole 32b. With this configuration of pressures the powder is pushed out of the chamber 11 through the outlet opening 13 and goes into the conveying tube positioned downstream of the device.

When the suction/reconveying cycle of the powders has finished, the pumping device, for example the 10a, starts again with the first suction phase described previously, thus carrying out a periodic type of operation. The other pumping device, for example the 10b, carries out the same operating cycle, but with a delay in comparison with device 10a equal to half the period of the cycle. In this manner the powders are delivered with continuity, as the suction phase of one of the two devices 10 is compensated by the simultaneous delivery by the other device 10.

The flow can be regulated both by varying the time of duration of the single phases and by varying the values of the conveying air pressure and of the suction air.

Following the description the numerous advantages that can be achieved with the present invention in comparison with the known technique appear evident. In fact, in comparison to the Venturi systems a very constant flow of powder over time, use of highly reduced conveying air, and a limited dimension of the conveying tubes have been achieved; in addition the new device undergoes less wear, needs less maintenance and can be easily cleaned automatically.

In comparison to the known volumetric systems of the technique, on the other hand, the device in accordance with the invention permits greater constructive simplicity and lower costs of implementation thanks to the absence of moving devices. The new device needs less maintenance also in comparison to the volumetric type of systems.

In comparison with the known systems of pumping with tubular chamber, suction and injection phases have been optimized thanks to the presence of the two holes axially distanced for the connection of the chamber to the pressure and vacuum sources. In addition, thanks to the type of drive of the inlet and outlet valves, it has been possible to overlap the injection phases of the two chambers, thus obtaining a satisfactorily continuous flow of powder in output.

Nevertheless, one pumping device 10 can be used when the pulsing flow of powder in output is satisfactory.

Naturally, the above description of an embodiment applying the innovative principles of the present invention is given as example of such innovative principles and must not therefore be taken as limiting within the sphere of the patent right claimed. For example, the range of flows that can be reached by the new device can be widened, as well as suitably dimensioning its components, also placing in parallel any number whatsoever of pumping devices 10, instead of using only two as previously described.

When continuous flow in high grade is required, many pumps devices can be used in parallel. For example, advantageously the pumping devices with different phase to each other (one loading, one full and one discharging) can be used.

The invention claimed is:

1. Device for conveying powders through pipelines, said device comprising
    at least one pumping device including, in turn, a suction inlets, and a delivery outlet,
    a tubular chamber having opposite ends connected respectively to said suction inlet through an input valve and to said delivery outlet through an output valve,
    an outlet hole of the chamber and an inlet hole of the chamber for connection to only a vacuum source and to only a pressure source, respectively,
    said outlet hole and said inlet hole being located in axially distanced positions along a longitudinal axis of the chamber to create respectively and alternatively a vacuum in the chamber relative to an environment upstream of the device and a pressure in the chamber relative to an environment downstream of the device,
    the outlet hole being located adjacent to the output valve and the inlet hole being located adjacent to the input valve, the outlet hole being located downstream from the inlet hole.

2. Device according to claim 1, wherein the at least one pumping device are two pumping devices connected in parallel and operating in opposition to achieve a substantially constant flow of powder in output.

3. Device according to claim 1, wherein the input valve and the outlet valve are sleeve valves with each including a soft tube passing through a drive chamber.

4. Device according to claim 3, wherein the drive chambers are located in a containing body.

5. Device according to claim 3, wherein the soft tube is porous and allows passage of air and are impermeable to conveyed powders.

6. Device according to claim 5, wherein a first porous tube is situated in proximity of the outlet valve and a second porous tube is situated in proximity of the inlet valve.

7. Device according to claim 6, wherein said first and said second porous tubes are a tubular segment of a wall of the tubular chamber.

8. Device according to claim 1, further comprising a first and a second porous tube allowing passage of air through the chamber and are impermeable to conveyed powders conveyed and in each pumping device one soft tube is adjacent to the input valve and one soft tube is adjacent to the output valve.

9. Device according to claim 1, wherein the at least one pumping device includes two pumping devices connected in parallel and operating in a different phase to each other.

* * * * *